United States Patent
Redder (10) Patent No.: US 10,710,846 B2
(45) Date of Patent: Jul. 14, 2020

(54) STOP RING HAVING A SUPPORT EYE LUG USED TO SUSPEND A STOPPING MEANS OR LASHING MEANS

(71) Applicant: J. D. Theile GmbH & Co. KG, Schwerte (DE)

(72) Inventor: Manfred Redder, Selm (DE)

(73) Assignee: RMR ENGINEERING GBR, Lünen (DE)

( * ) Notice: Subject to any disclaimer, the term of this patent is extended or adjusted under 35 U.S.C. 154(b) by 0 days.

(21) Appl. No.: 16/332,545

(22) PCT Filed: Oct. 30, 2017

(86) PCT No.: PCT/DE2017/100924
§ 371 (c)(1),
(2) Date: Mar. 12, 2019

(87) PCT Pub. No.: WO2018/082742
PCT Pub. Date: May 11, 2018

(65) Prior Publication Data
US 2019/0210844 A1    Jul. 11, 2019

(30) Foreign Application Priority Data
Nov. 4, 2016   (DE) .................... 20 2016 006 871 U (51) Int. Cl.
*B66C 1/66*     (2006.01)
*F16G 15/08*    (2006.01)
(Continued)

(52) U.S. Cl.
CPC .............. *B66C 1/66* (2013.01); *F16B 45/00* (2013.01); *F16G 15/08* (2013.01); *F16B 35/06* (2013.01)

(58) Field of Classification Search
CPC .................................. B66C 1/66; B66C 1/10
(Continued)

(56) References Cited

U.S. PATENT DOCUMENTS

| | | | |
|---|---|---|---|
| 4,669,618 A * | 6/1987 | Brand | B66C 1/66 |
| | | | 212/271 |
| 6,017,071 A * | 1/2000 | Morghen | B66C 1/66 |
| | | | 294/215 |

(Continued)

FOREIGN PATENT DOCUMENTS

| | | |
|---|---|---|
| DE | 4336779 A1 | 4/1995 |
| DE | 202016004078 U1 | 8/2016 |
| JP | 2006118676 A | 5/2006 |

OTHER PUBLICATIONS

International Search Report dated May 11, 2018 in parent International application PCT/DE2017/100924.
(Continued)

*Primary Examiner* — Paul T Chin
(74) *Attorney, Agent, or Firm* — Polson Intellectual Property Law, PC; Margaret Polson (57) ABSTRACT

The present disclosure relates to a stop ring (1) comprising a support eye lug (2) used to suspend a stopping or lashing means and a threaded pin (6), rotatably arranged with respect to the supporting eye lug (2), for fixing to an object to be lifted or fixed, the support eye lug (2) and the threaded pin (6) being connected to each other in a form-fitting manner by a bearing journal (5) of the threaded pin (6), which engages in the bearing bore (4) of the support eye lug (2), and a plurality of bearing rollers (8), and having a locking element (13) by means of which, in a locking position, the support eye lug (2) and the threaded pin (6) can be blocked against rotation, characterized in that the bottom (3) of the support eye lug (2) is closed at the top.

20 Claims, 7 Drawing Sheets

(51) Int. Cl.
*F16B 45/00* (2006.01)
*F16B 35/06* (2006.01)

(58) Field of Classification Search
USPC ............ 294/215, 89, 82.1; 403/78, 164
See application file for complete search history.

(56) References Cited

U.S. PATENT DOCUMENTS

| | | | | |
|---|---|---|---|---|
| 6,199,925 | B1 * | 3/2001 | Alba | B66C 1/66 |
| | | | | 294/215 |
| 6,612,631 | B1 * | 9/2003 | Pearl | B66C 1/66 |
| | | | | 248/499 |
| 8,757,693 | B2 * | 6/2014 | Fuller | B66C 1/66 |
| | | | | 294/215 |
| 10,207,902 | B2 * | 2/2019 | Bradshaw | B66C 1/66 |
| 10,450,174 | B1 * | 10/2019 | Kucinic | B66C 1/66 |
| 2005/0017522 | A1 * | 1/2005 | Smetz | B66C 1/66 |
| | | | | 294/215 |
| 2005/0069379 | A1 * | 3/2005 | Smetz | B66C 1/66 |
| | | | | 403/164 |
| 2013/0082477 | A1 | 4/2013 | Fuller et al. | |

OTHER PUBLICATIONS

Written Opinion of the International Searching Authority dated May 11, 2018 in parent International application PCT/DE2017/100924.

* cited by examiner

STOP RING HAVING A SUPPORT EYE LUG USED TO SUSPEND A STOPPING MEANS OR LASHING MEANS

BACKGROUND

The present disclosure relates to a stop ring with a support eye lug used to support a stopping or lashing means and a threaded pin for fixing to an object to be lifted or fixed.

Stop rings are used for lifting or fixing objects such as machines or machine components. For this purpose, such a stop ring includes a threaded pin for fixing to an object to be lifted or fixed and a support eye lug for attaching stopping or lashing means.

Stop rings, which are also known as eyebolts or ringbolts, are standardized components (DIN 580) and are used in great quantities. The standardized ringbolts are produced as integrally formed rings with a threaded pin that is forged or cast onto the ring. The stopping or lashing means may potentially exert torque onto the threaded pin, depending on the direction of the applied force, which may lead to an overload or loosening of the threaded pin.

In addition to the integrally formed embodiments, ringbolts with rotatable threaded pins are also known. For example, such a ringbolt is described in DE 43 36 780 A1. It comprises a support eye lug with an insert opening at the base of the eye, in which the shaft of the threaded pin connected to the support eye lug is rotatably supported. The threaded pin is equipped with a head for transferring tensile forces between it and the support eye lug. An additional tool is required for mounting or removing the ringbolt, which must be stored separately after the mounting or removal process is completed, which presents the risk of losing this tool or not having it available in the location where it is needed.

Another ringbolt is known from EP 0 654 611 A1. It also requires a specific tool for mounting or removing the ringbolt. However, unlike in the case in which the tool is stored separately, this tool can be attached to the support eye lug of the ringbolt in such a manner that it can initiate a screwing motion in the threaded pin via the support eye lug. When the tool is not in use and not engaged in the threaded pin, it is suspended from the ringbolt in an undetachable manner Thus, the tool significantly extends beyond the outer edge of the support eye lug, creating the risk during application in a tight space that the outwardly extending tool catches on an object present in the tight space, causing the tool to tear off.

EP 2 646 698 B1 shows another embodiment of a ringbolt in which at least one locking element is attached to the support eye lug radially next to the pin head and is fixed in that location, wherein the locking element can be moved into an initial position in which it releases the pin head, and into a locking position in which it blocks the pin head in a rotational direction against the support eye lug. As the locking mechanism is open at the top there is a risk of contamination, impeding or preventing the actuation of the locking mechanism.

While the connection between the pin head and support eye lug is rotatable in all aforementioned embodiments, said connection is not designed as a roller bearing in these embodiments, which is disadvantageous, because the ringbolts then cannot be rotated under load, because of the risk that the ringbolts could unscrew themselves when rotating under load. A ringbolt is known from DE 20 2012 100 764 U1, which comprises a threaded pin and an eye lug, wherein the eye lug is connected to the outer component of a bearing, whereas the threaded lug includes a corresponding inner ring of a bearing. The outer component of the bearing is supported on the inner component of the bearing via inserted rollers. The rollers are arranged in a ring shape around the inner component of the bearing in at least two planes that are parallel to each other at a fixed distance. An additional tool is required for mounting or removing the threaded pin, which introduces the aforementioned disadvantages. Another disadvantage is that the base of the eye in the support eye lug is open to the top to facilitate access to the head of the threaded pin. This increases the risk of contamination entering the bearing.

Based on the embodiments discussed here, an aspect of the present disclosure is to further develop the stop ring mentioned above in such a manner that it can be rotated under load, is resistant to contamination, and can be mounted and removed without additional tools.

SUMMARY

Proceeding from the foregoing, an aspect of the present disclosure is solved by a stop ring of the type mentioned above, wherein the base of the eye in the support eye lug is closed, a locking pin is arranged in the closed and therefore protected space, and the threaded pin and the support eye lug are connected to each other in a form-fitting manner by a bearing journal, which engages in the bearing bore of the support eye lug, and a plurality of bearing rollers.

According to one embodiment, the bearing rollers are designed as tapered rollers. Here, the bearing bore of the support eye lug serves as an outer bearing race while the bearing journal of the threaded pin is designed as an inner bearing race. The angle between roller axis and longitudinal axis of the bearing race is chosen such that the bearing rollers are always under a compression load, both when the support eye lug is subjected to tensile loads and when it is subjected to transverse loads. The support eye lug therefore can be rotated even when under load.

According to another embodiment of the stop ring, it is equipped with an adjustable locking pin, such that no additional tools are required for mounting or removing the stop ring. When the locking pin is moved into the locking position the threaded pin is blocked from rotating within the support eye lug, such that the threaded pin can be screwed into or out of the thread on the object to be lifted or fixed by rotating the support eye lug. When the locking pin is moved into its initial position, the rotational movement between the support eye lug and the threaded pin is enabled. The arrangement of the locking pin in the closed bottom of the support eye lug results in a space-saving arrangement, which thereby also is protected against any kind of contamination.

BRIEF DESCRIPTION OF THE DRAWINGS

In the following, the present disclosure is described based on an embodiment while referring to the attached drawings. The drawings show.

DETAILED DESCRIPTION

Figure 1:
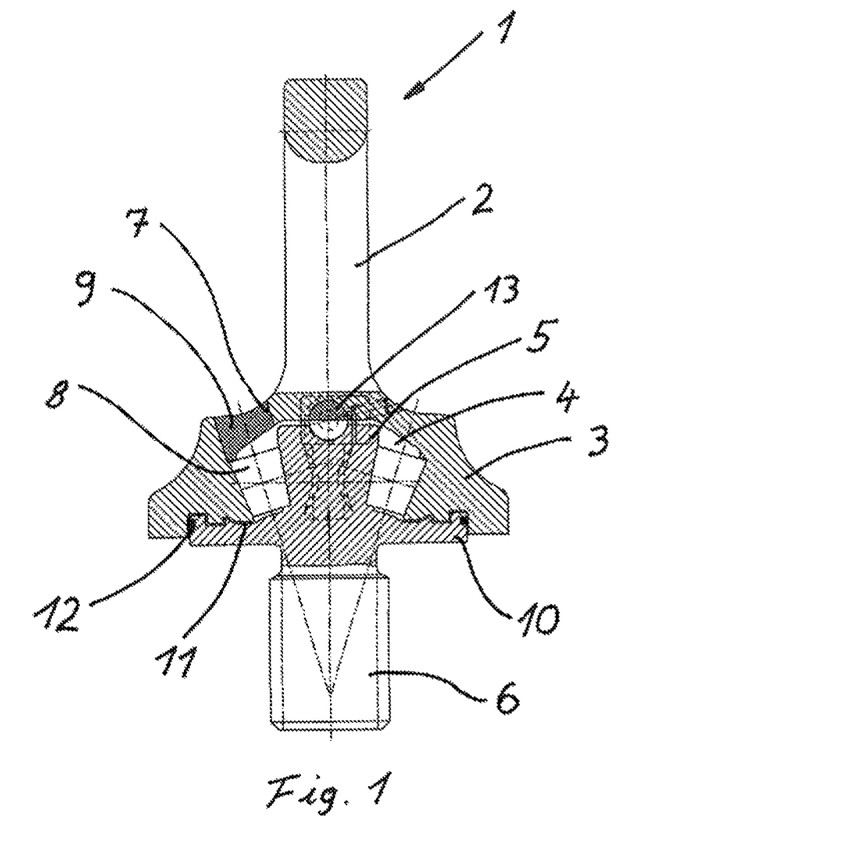
FIG. 1 A schematic, partially sectional view of a stop ring

FIG. 1 shows a stop ring 1 with a support eye lug 2 and a bottom 3 designed as a bearing bore 4, in which a bearing journal 5 of the threaded pin 6 is arranged. In order to create a form-fitting connection between the support eye lug 2 and the threaded pin 6, and to facilitate a smooth rotational movement of the support eye lug 2 relative to the threaded pin 6, bearing rollers 8 are inserted between the bearing bore 4 and the bearing journal 5 through an opening 7 in the bottom 3 of the support eye lug 2. The opening 7 is closed by a sealing plug 9. The plug 9 can be pressed in, punched in or glued in. In order to protect the bearing against contamination, the collar 10 of the threaded pin 6 is equipped with a labyrinth seal 11 and a sealing ring 12. The locking pin 13 is shown in its initial position in FIG. 1.

Figure 2:
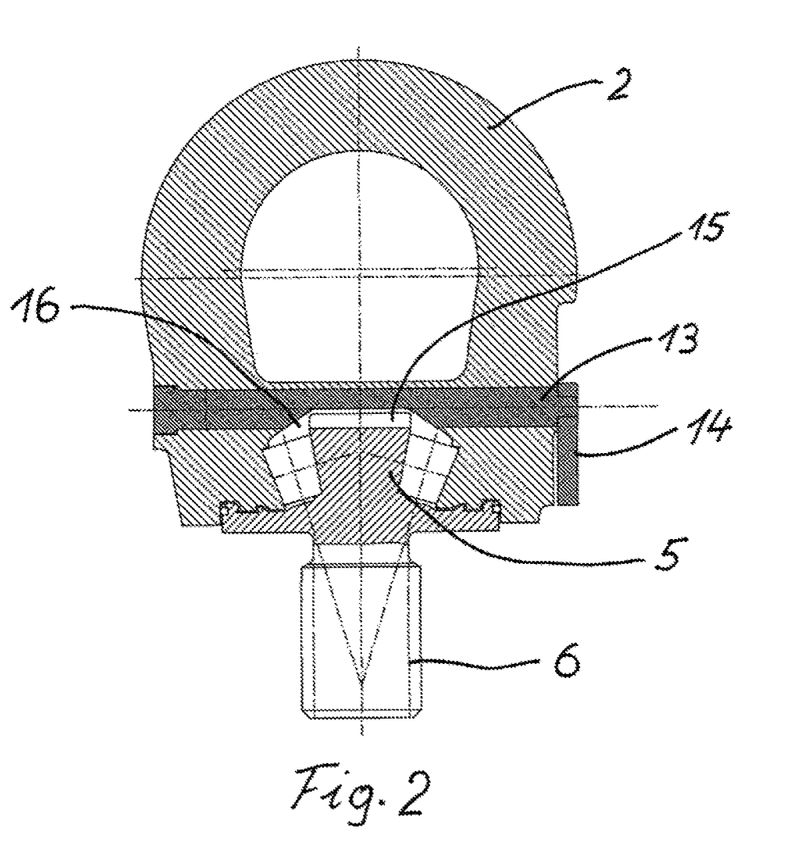
FIG. 2 A schematic, partially sectional view of the stop ring, with the locking pin in its initial position FIG. 3 A side view of the stop ring shown in FIG. 2, with the adjusting lever in its initial position FIG. 4 A schematic, partially sectional view of the stop ring, with the locking pin in its locking position FIG. 5 A side view of the stop ring shown in FIG. 4, with the adjusting lever in its locking position FIG. 6 A front view of the stop ring shown in FIG. 4

FIG. 2 shows the locking mechanism between the support eye lug 2 and the threaded pin 6 via the locking pin 13. The head of the bearing journal 5 of the threaded pin 6 is equipped with a slot 15, into which a section of the locking pin 13 can extend after it is turned by 180°. In the initial position of the locking pin 13 shown here, no contact can be made between the locking pin 13 and the bearing journal 5, as the locking element 13 has a recess 16 in the area of the bearing journal 5, said recess 16 extending over a length that at least equals the diameter of the bearing journal 5. The support eye lug 2 therefore is freely rotatable against the threaded pin 6 screwed into an object to be lifted or fixed.

Figure 3:
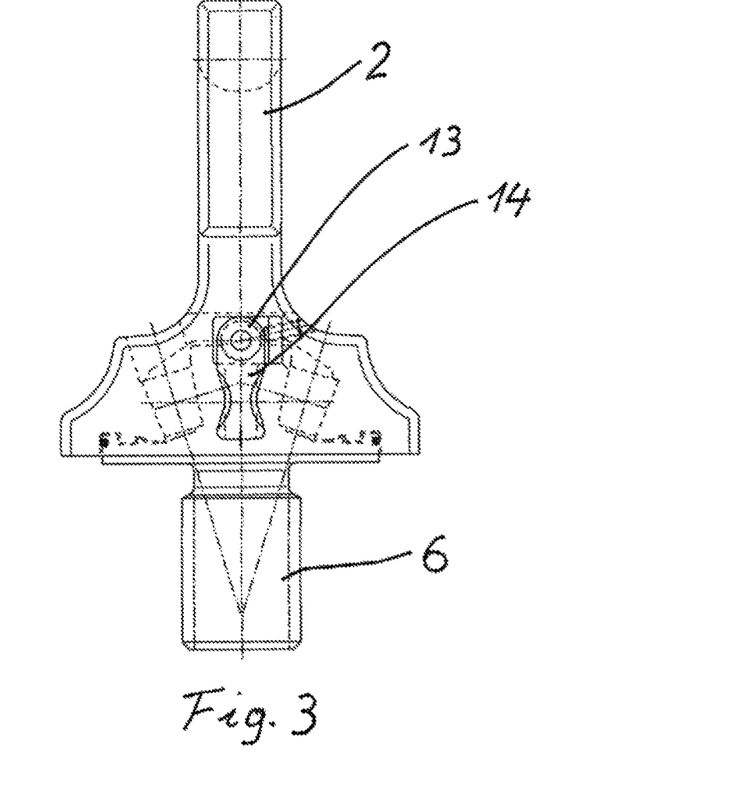

The view in FIG. 3 shows the adjusting lever 14, with which the locking pin 13 can be turned from its initial position shown here to its locking position.

Figure 4:
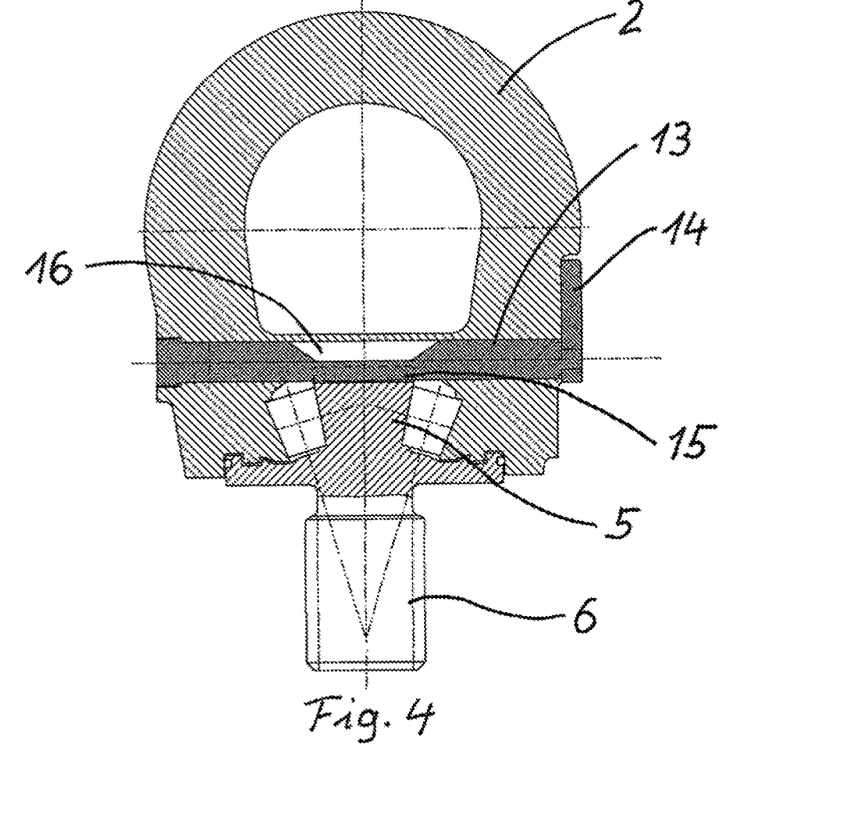

The drawing in FIG. 4 shows the locking process between the support eye lug 2 and the threaded pin 6 via the locking pin 13. Using the adjusting lever 14, which is accessible from the outside, the locking pin 13 is rotated by 180°, such that the section of the locking pin, which is located opposite from the recess 16, protrudes into the slot 15 of the bearing journal 5. In this locked position, it is no longer possible to rotate the support eye lug 2 relative to the threaded bearing journal 5. Thus, the threaded pin 6 can be screwed into an object to be lifted or fixed without additional tools, by rotating the support eye lug 2.

Figure 5:
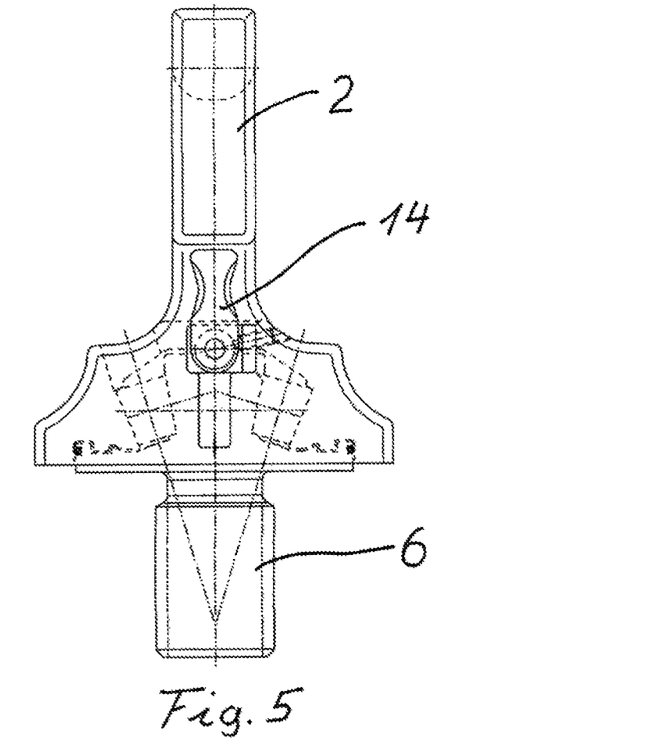
Figure 6:
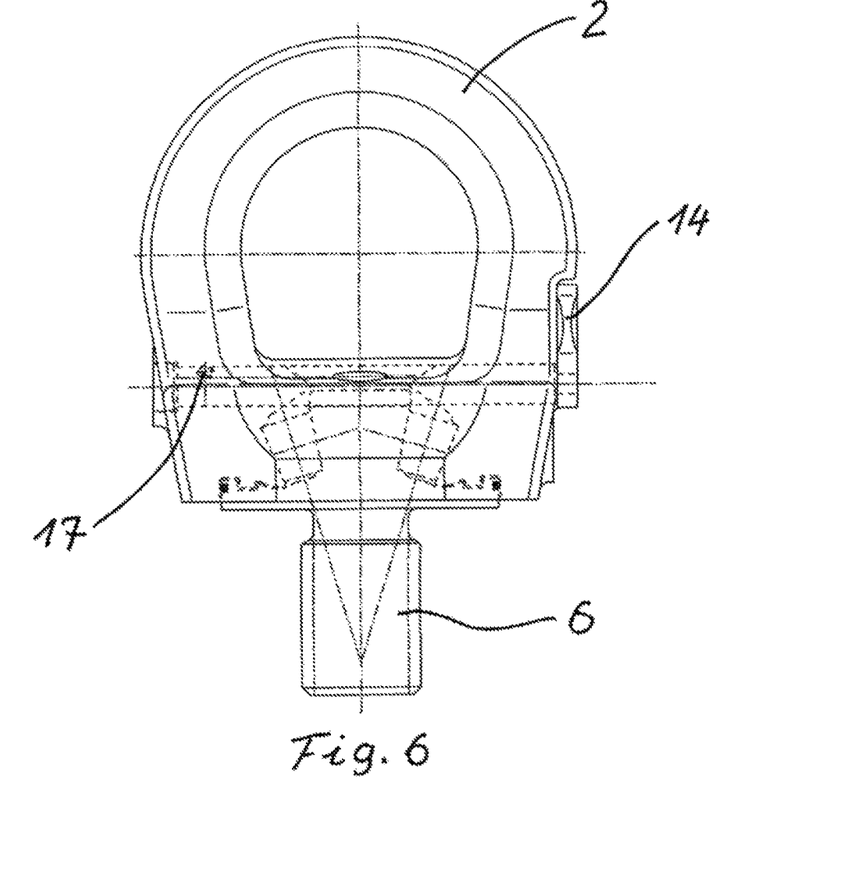

FIG. 5 shows a side view of the stop ring 1 with the adjustment lever in its locked position. FIG. 6 shows the front view of the stop ring shown in FIG. 5, in which the positioning of the ball locking pin 17, by which the locking pin 13 can be fixed into its initial and locking positions, is visible.

Figure 7:
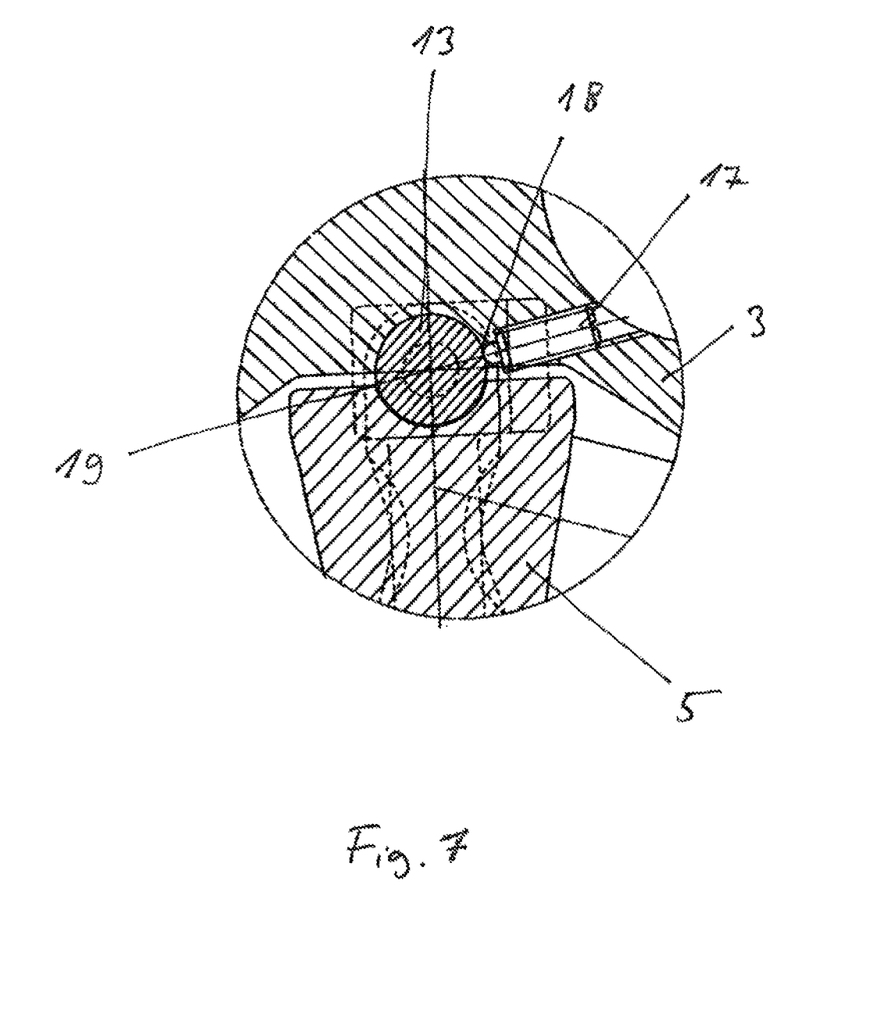
FIG. 7 An enlarged, partially sectional view of the locking pin in the plane of the ball locking pin

FIG. 7 shows an enlarged detail of the area of the locking pin 13 and of a ball locking pin 17, which is known from the art. Depending on the position of the locking pin, either its initial position or its locking position, the spring-loaded ball of the ball locking pin 17 enters the counterbore 18 or 19 of the locking pin 13. Thus, when swiveling the locking element 13 via the adjusting lever 14, the ball must be pushed into the ball locking pin against the spring force pressing against the ball. Thus, any spontaneous transition from the initial position to the locking position or vice versa is prevented.

LIST OF REFERENCE NUMBERS

1 Stop ring
2 Support eye lug
3 Bottom of the support eye lug
4 Bearing bore
5 Bearing journal
6 Threaded pin
7 Bore in the bottom of the support eye lug 3
8 Bearing roller
9 Sealing plug
10 Collar
11 Labyrinth seal
12 Sealing ring
13 Locking pin
14 Adjusting lever
15 Slot in the bearing journal 5
16 Recess in the locking pin 13
17 Ball locking pin
18 Counterbore
19 Counterbore

The invention claimed is:

1. A stop ring comprising:
a support eye lug used to suspend a stopping or lashing means and a threaded pin, rotatably arranged with respect to the support eye lug, for fixing to an object to be lifted or fixed,
the support eye lug and the threaded pin being connected to each other in a form-fitting manner by a bearing journal of the threaded pin, which engages in a bearing bore of the support eye lug, a plurality of bearing elements, and having a locking element by means of which, in a locking position, the support eye lug and the threaded pin can be blocked against rotation,
the bottom of the support eye lug closed at the top, wherein bearing rollers are provided as bearing elements, and a rotatably mounted locking pin is provided at the bottom of the support eye lug, the locking pin, when in an initial position, not being engaged in the bearing journal of the threaded pin, but which can be moved into a locking position, which blocks rotation by actuation from the outside, and
the locking pin is designed as a torsion rod with a recess the center.

2. The stop ring of claim 1, wherein the locking pin has an approximately semi-circle profile in an area of the recess.

3. The stop ring of claim 2, wherein the approximately semi-circular profile of the locking pin extends over a length, which is at least equal to the diameter of the bearing journal the threaded pin.

4. The stop ring of claim 3, wherein the locking pin can be rotated via an adjusting lever.

5. The stop ring of claim 3, wherein the rotational angle of the locking pin is approximately 180°.

6. The stop ring of claim 3, wherein the bearing journal is equipped with a slot.

7. The stop ring of claim 3, wherein the locking pin can be fixed in the initial position and in the locking position.

8. The stop ring of claim 2, wherein the locking pin can be rotated via an adjusting lever.

9. The stop ring of claim 2, wherein the rotational angle of the locking pin approximately 180°.

10. The stop ring of claim 2, wherein the bearing journal is equipped with a slot.

11. The stop ring of claim 2, wherein the locking pin can be fixed in initial position and in locking position.

12. The stop ring of claim 11, wherein the ball of a ball locking pin enters counterbores for fixing a final position, the initial position and the locking position.

13. The stop ring of claim 12, wherein a bore is provided in the bottom of the support eye lug for mounting the bearing rollers.

14. The stop ring of claim 1, wherein a bore is provided in the bottom of the support eye lug for mounting the bearing rollers.

15. The stop ring of claim 14, wherein the bore in the bottom of the support eye lug is sealed with a plug.

16. The stop ring of claim 1, wherein the threaded pin is equipped with a collar.

17. The stop ring of claim 16, wherein a labyrinth seal is provided in the collar.

18. The stop ring of claim 17, wherein an annular gap between the bottom of the support eye lug and the collar of the threaded pin sealed with a sealing ring.

19. The stop ring of claim 18, wherein the annular gap between the bottom of the support eye lug and the collar of the threaded pin is sealed with a sealing ring.

20. The stop ring of claim 2, wherein the threaded pin is equipped with a collar.

* * * * *